(12) United States Patent
Yamaguchi

(10) Patent No.: US 9,224,212 B2
(45) Date of Patent: Dec. 29, 2015

(54) IMAGE PROCESSING APPARATUS AND IMAGE PROCESSING METHOD

(71) Applicant: CANON KABUSHIKI KAISHA, Tokyo (JP)

(72) Inventor: Shota Yamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 14/020,115

(22) Filed: Sep. 6, 2013

(65) Prior Publication Data

US 2014/0072180 A1   Mar. 13, 2014

(30) Foreign Application Priority Data

Sep. 12, 2012  (JP) ................. 2012-200299

(51) Int. Cl.
  *G06K 9/00* (2006.01)
  *G06T 7/20* (2006.01)
(52) U.S. Cl.
  CPC .................... *G06T 7/2053* (2013.01)
(58) Field of Classification Search
  USPC ....................................... 382/103
  See application file for complete search history.

(56) References Cited

U.S. PATENT DOCUMENTS

| | | | | |
|---|---|---|---|---|
| 5,237,405 A | * | 8/1993 | Egusa et al. | 348/208.1 |
| 5,712,474 A | * | 1/1998 | Naneda | 250/208.1 |
| 6,804,419 B1 | * | 10/2004 | Miyake | 382/300 |
| 8,149,911 B1 | * | 4/2012 | Alvarez et al. | 375/240.12 |
| 2005/0180506 A1 | * | 8/2005 | Wittebrood et al. | 375/240.16 |
| 2005/0226462 A1 | * | 10/2005 | Wittebrood et al. | 382/103 |
| 2008/0025403 A1 | * | 1/2008 | Sato et al. | 375/240.16 |
| 2008/0278633 A1 | * | 11/2008 | Tsoupko-Sitnikov et al. | 348/699 |
| 2009/0110291 A1 | * | 4/2009 | Matsumura et al. | 382/195 |
| 2011/0129015 A1 | * | 6/2011 | Nguyen et al. | 375/240.16 |
| 2011/0254930 A1 | * | 10/2011 | Sugimoto | 348/51 |
| 2011/0280308 A1 | * | 11/2011 | Oishi et al. | 375/240.16 |

FOREIGN PATENT DOCUMENTS

| | | |
|---|---|---|
| JP | 2006229868 A | 8/2006 |
| JP | 2010183386 A | 8/2010 |

* cited by examiner

*Primary Examiner* — Alex Liew
(74) *Attorney, Agent, or Firm* — Canon U.S.A., Inc. IP Division

(57) ABSTRACT

An image processing apparatus configured to detect a position deviation between a first image and a second image includes a first memory configured to store motion vectors between the first image and the second image as a first motion vector group, a second memory configured to store, as a second motion vector group, motion vectors extracted from the first motion vector group determined to have a higher reliability than a predetermined threshold, an acceptable motion vector selection unit configured to calculate a temporary position deviation parameter from the second motion vector group, and select the motion vectors representing the position deviation as an acceptable motion vector group from the first motion vector group, using the temporary position deviation parameter, and a parameter estimation unit configured to estimate the position deviation parameter representing the position deviation from the acceptable motion vector group.

16 Claims, 13 Drawing Sheets

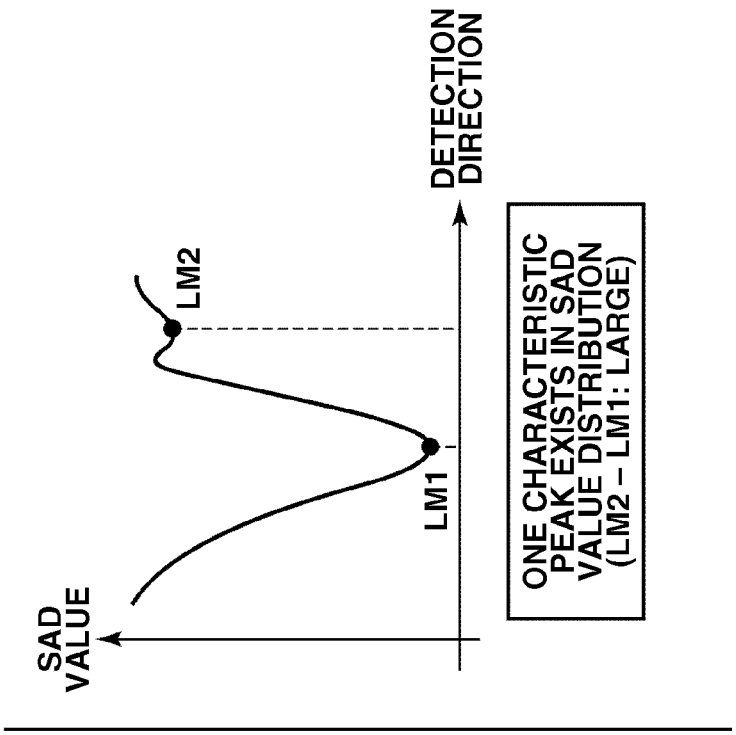
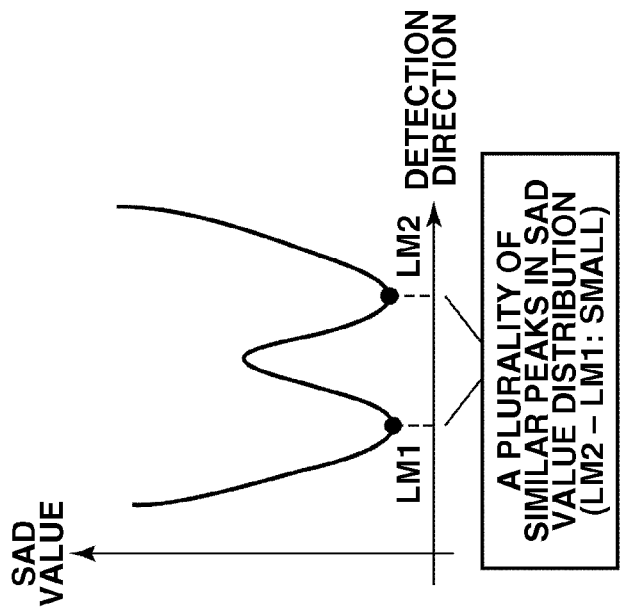

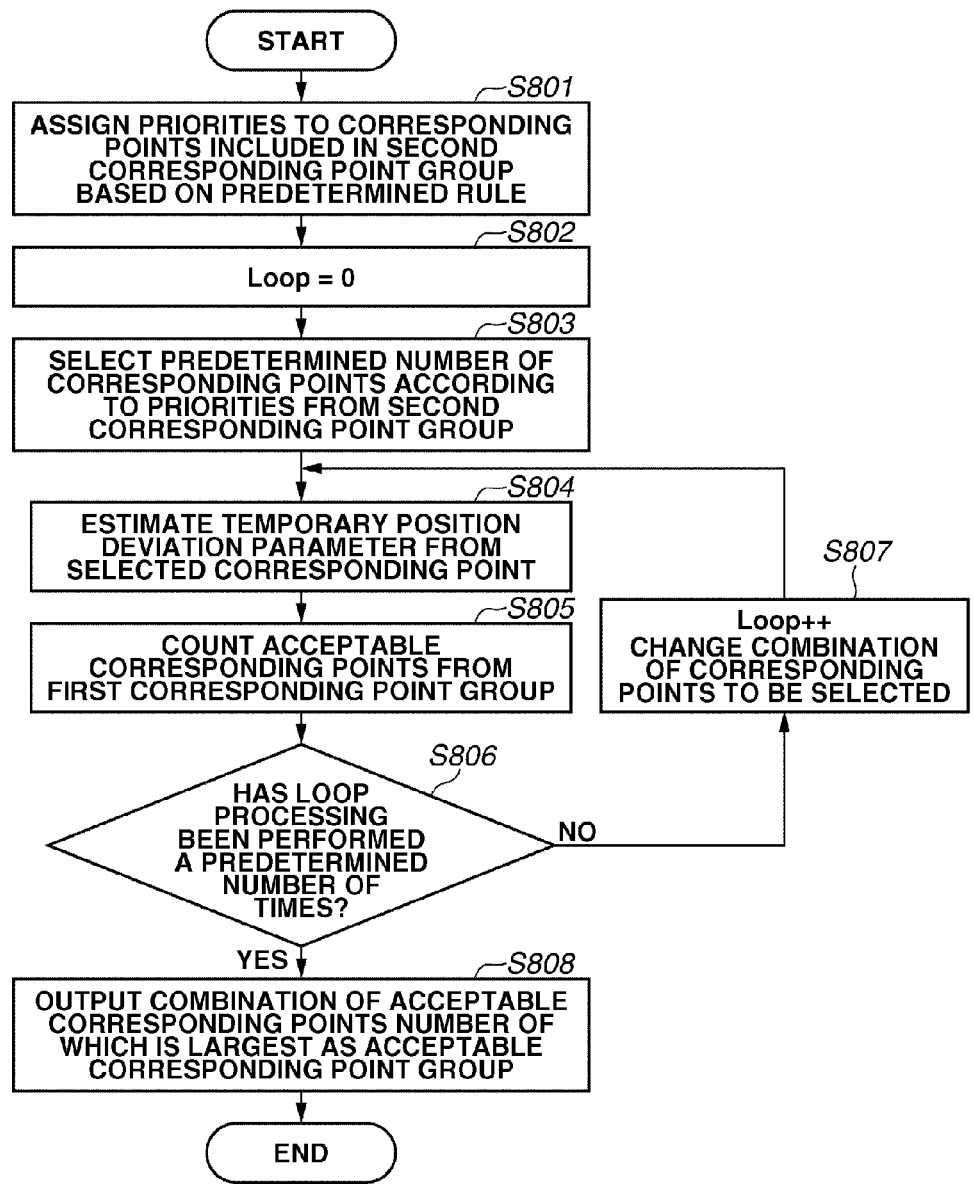

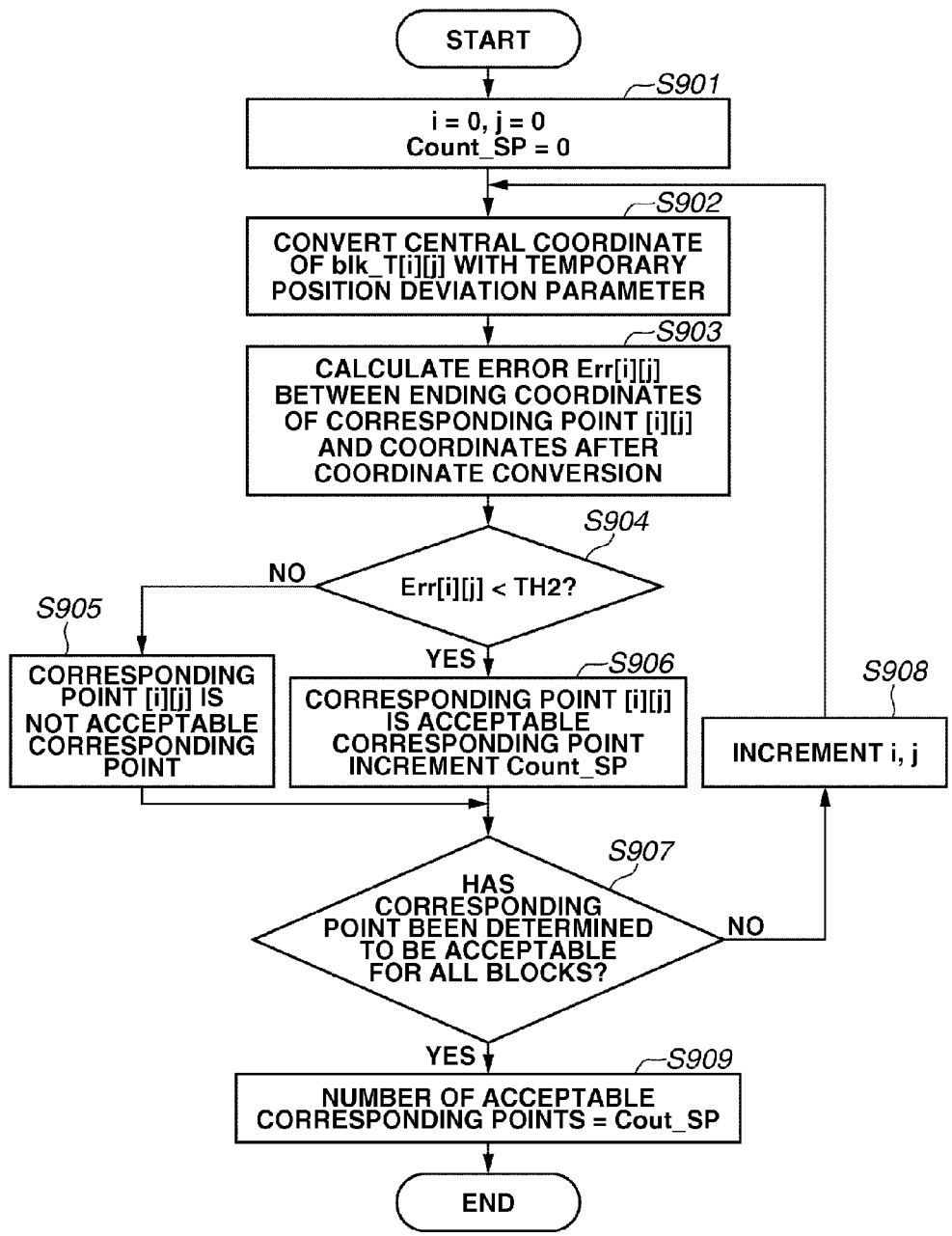

IMAGE PROCESSING APPARATUS AND IMAGE PROCESSING METHOD

BACKGROUND OF THE INVENTION

1. Field of the Invention

The present invention relates to an image processing apparatus for capturing a plurality of images and detecting a position deviation between the images.

2. Description of the Related Art

A technique for capturing and combining a plurality of images to enlarge an imaging area has been proposed. In such a technique, a technique for detecting a position deviation between the images due to a camera shake is essential. As the technique for detecting the position deviation, various methods have been proposed. Examples include Japanese Laid-Open Patent Application No. 2006-229868 and Japanese Laid-Open Patent Application No. 2010-183386.

The technique discussed in Japanese Laid-Open Patent Application No. 2006-229868 detects a plurality of corresponding points using a method of template matching from two images to be detected, then finds respective reliabilities of the corresponding points, extracts, out of the corresponding points having high reliabilities, only the corresponding point representing a camera shake, and calculates a parameter representing a final position deviation.

The technique discussed in Japanese Laid-Open Patent Application No. 2010-183386 calculates a parameter representing a position deviation from a corresponding point having a high reliability, similar to Japanese Laid-Open Patent Application No. 2006-229868, while using an extended affine transformation coefficient corresponding to a tilt component of an image as the parameter.

SUMMARY OF THE INVENTION

According to an aspect of the present invention, an image processing apparatus configured to detect a position deviation between a first image and a second image includes a detection unit configured to detect a plurality of motion vectors between the first image and the second image for each area, a first memory configured to store respective pieces of information about the plurality of motion vectors as a first motion vector group, a reliability calculation unit configured to calculate a reliability with respect to the detection of the position deviation for each of the pieces of information about the motion vectors to be read out of the first memory, an extraction unit configured to extract the information about the motion vector of which reliability has been determined to be higher than a predetermined threshold value, a second memory configured to store the extracted information about the motion vector as a second motion vector group, an acceptable motion vector selection unit configured to calculate a temporary position deviation parameter from the second motion vector group to be read out of the second memory, and select the motion vector representing a position deviation corresponding to a position deviation represented by the temporary position deviation parameter as an acceptable motion vector group from the first motion vector group, and a parameter estimation unit configured to estimate the position deviation parameter representing the position deviation from the acceptable motion vector group.

According to another aspect of the present invention, an image processing method for detecting a position deviation between a first image and a second image includes detecting a plurality of motion vectors between the first image and the second image, storing the plurality of motion vectors as a first motion vector group in a first memory, calculating a reliability with respect to the detection of the position deviation for each of the motion vectors to be read out of the first memory, extracting the motion vector the reliability of which has been determined to be higher than a predetermined threshold value, storing the extracted motion vector group as a second motion vector group in a second memory, calculating a temporary position deviation parameter from the second motion vector group to be read out from the second memory, and selecting the motion vector representing a position deviation corresponding to a position deviation represented by the temporary position deviation parameter as an acceptable motion vector group from the first motion vector group, and estimating the position deviation parameter representing the position deviation from the acceptable motion vector group.

Further features and aspects of the present invention will become apparent from the following detailed description of exemplary embodiments with reference to the attached drawings.

BRIEF DESCRIPTION OF THE DRAWINGS

FIGS. 7A and 7B illustrate typical correlation value maps obtained when a repetitive pattern exists and when a repetitive pattern does not exist, respectively.

FIG. 8 is a flowchart illustrating processing performed by an acceptable corresponding point selection unit 110.

FIG. 9 is a flowchart illustrating counting of acceptable corresponding points (such as in S805 of FIG. 8).

DESCRIPTION OF THE EMBODIMENTS

A first exemplary embodiment of the present invention will be described below with reference to the drawings. In the present exemplary embodiment, the following description assumes a function of combining four images captured at an exposure time that is minimally affected by a camera shake while also averaging the images, to electronically suppress the camera shake.

Figure 1:
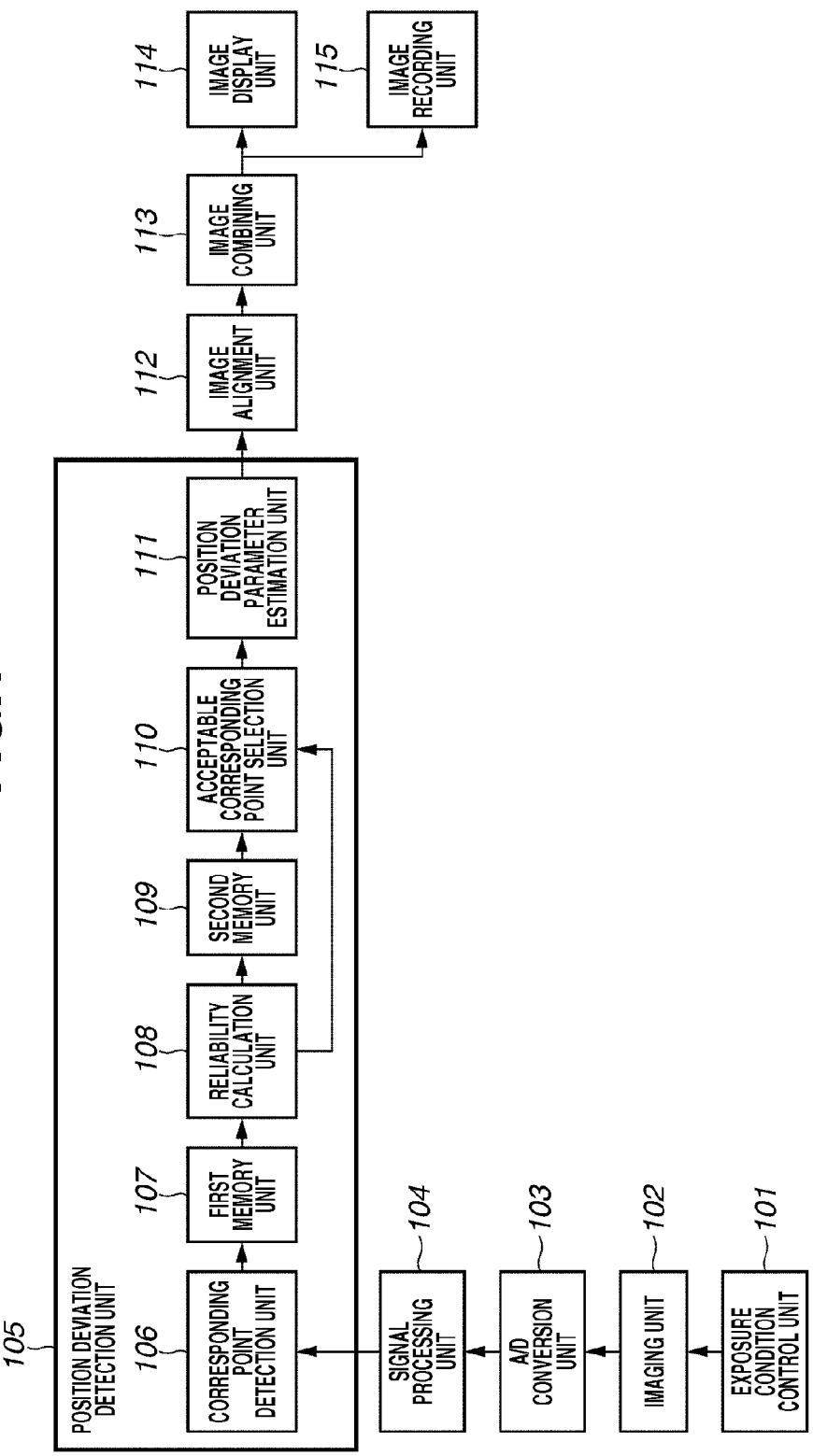
FIG. 1 is a block diagram illustrating a configuration of an image processing apparatus according to a first exemplary embodiment.

FIG. 1 is a block diagram illustrating a configuration applicable to an image processing apparatus according to the first exemplary embodiment of the present invention. Each block will be specifically described with reference to FIG. 1.

An exposure condition control unit 101 determines an exposure condition during imaging. The exposure condition includes at least one of a shutter speed, a diaphragm value, and a sensitivity. In the present exemplary embodiment, the exposure condition is not changed while imaging processing is performed four times. Therefore, the exposure condition control unit 101 outputs an exposure condition under which all images to be captured are captured under the same exposure condition. However, the exposure condition is not limited to this.

An imaging unit 102 performs an imaging operation a predetermined number of times according to the exposure condition. In the present exemplary embodiment, the imaging unit 102 includes a diaphragm, a mechanical shutter or an electronic shutter, and an image sensor with a Bayer array (including pixels in red (R), green (G), and blue (B)). The imaging unit 102 drives the diaphragm and the shutter to satisfy a predetermined condition output from the exposure condition control unit 101 every time the imaging operation is performed, to control an amount of light incident on the image sensor. An analog-to-digital (A/D) conversion unit 103 quantizes an image signal obtained by the imaging unit 102 into image data, and outputs the image data to a signal processing unit 104.

The signal processing unit 104 performs predetermined signal processing on the image data that is obtained by the quantization in the A/D conversion unit 103. The signal processing unit 104 performs noise reduction processing, distortion correction processing, white balance processing, and development processing, for example, as predetermined signal processing. In the development processing, an RGB image signal is converted into a luminance (Y) signal and a color difference (UV) signal. In the present exemplary embodiment, the signal processing unit 104 in a stage preceding a position deviation detection unit 105 and an image combining unit 113 performs the development processing on the image signal. However, the present invention is not limited to this. Units preceding and succeeding the image combining unit 113 may perform the development processing. The signal processing unit 104 outputs the image signal, on which the predetermined signal processing has been performed, to the position deviation detection unit 105.

The present exemplary embodiment assumes that four images (input images) are captured by a hand-held camera. Thus, a position deviation due to a camera shake occurs between the images to be input to the position deviation detection unit 105. When the images are combined while the position deviation has occurred therebetween, harmful effects occur. For example, the images are seen in multiple. Therefore, the images need to be combined after the position deviation is corrected. Therefore, in the position deviation detection unit 105, a position deviation parameter representing the position deviation between the input images is calculated. In the present exemplary embodiment, a projective transformation coefficient is used as the position deviation parameter.

The position deviation detection unit 105 will be described in detail below. As illustrated in FIG. 1, the position deviation detection unit 105 includes a corresponding point detection unit 106, a first memory unit 107, a reliability calculation unit 108, a second memory unit 109, an acceptable corresponding point selection unit 110, and a position deviation parameter estimation unit 111. Corresponding point detection unit 106 The corresponding point detection unit 106 detects, out of a plurality of images to be input, a corresponding point in the two predetermined images. In the present exemplary embodiment, when the four input images are given names, i.e., an image 1, an image 2, an image 3, and an image 4 in the captured order, the other images are aligned with the image 1 to match an angle of view of the image 1. Therefore, respective corresponding points (motion vectors) between the image 1 and the image 2, between the image 1 and the image 3, and between the image 1 and the image 4 need to be detected. The detection of the corresponding point between the image 1 and the image 2 will be described below. The image 1 is referred to as a base image (a first image), and the image 2 is referred to as a target image (a second image). Similar processing is performed for the detection of the respective corresponding points between the image 1 and the image 3, and between the image 1 and the image 4, and in this case, the image 3 and the image 4 are respectively target images.

Figure 2:
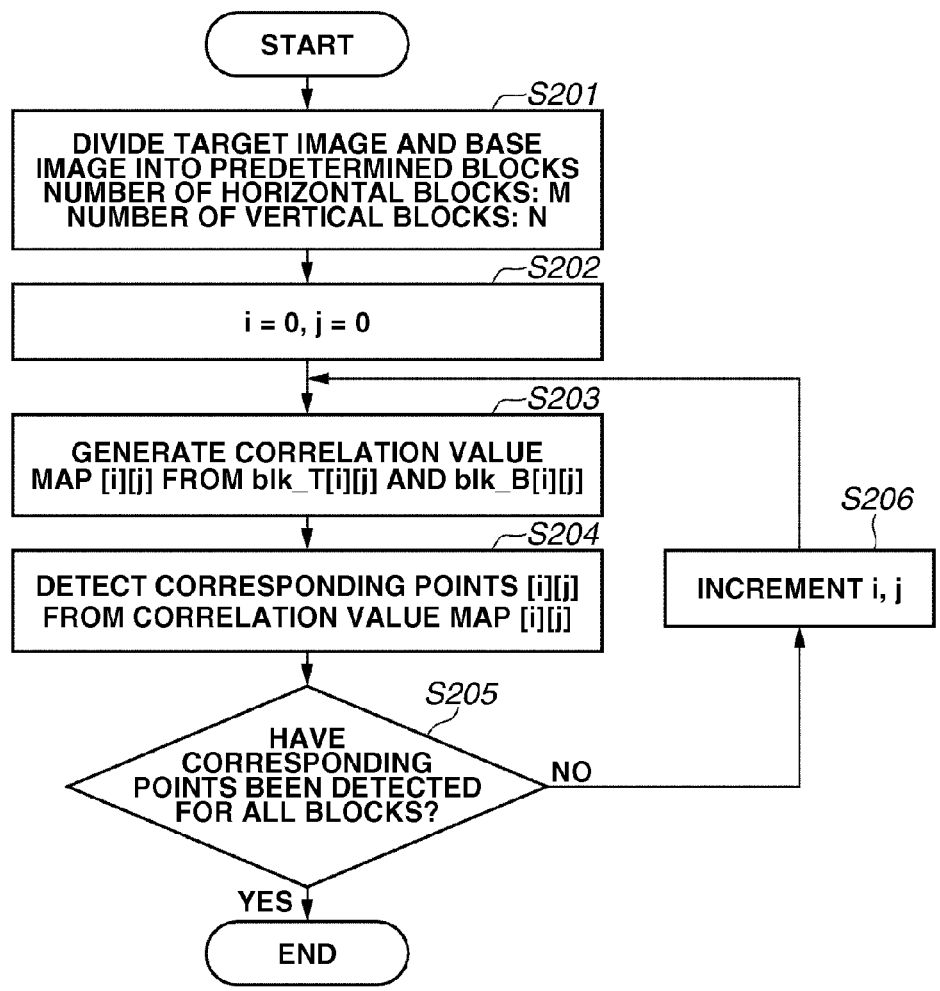
FIG. 2 is a flowchart illustrating processing performed by a corresponding point detection unit 106.
Figure 3:
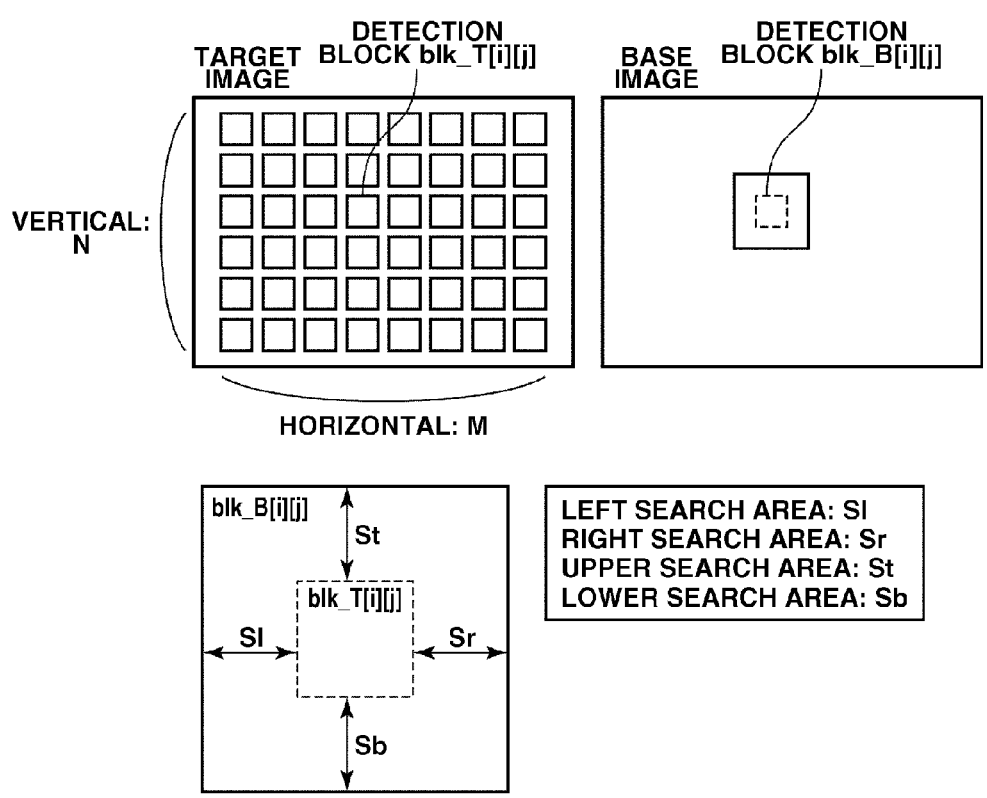
FIG. 3 illustrates an arrangement of detection blocks in the corresponding point detection unit 106.

An operation of the corresponding point detection unit 106 will be described below with reference to the drawings. FIG. 2 is a flowchart illustrating processing performed by the corresponding point detection unit 106. In step S201, the corresponding point detection unit 106 divides the target image and the base image into predetermined detection blocks blk_T[i][j] and blk_B[i][j], respectively. M detection blocks and N detection blocks are horizontally and vertically arranged, respectively, as illustrated in FIG. 3. The detection block blk_T[i][j] is used as a template, to search a corresponding detection block blk_B[i][j]. Thus, the detection block blk_B[i][j] is larger by sizes respectively corresponding to upper and lower and right and left predetermined search areas than the detection block blk_T[i][j]. In FIG. 3, the left, right, upper, and lower search areas are respectively Sl, Sr, St, and Sb.

Figure 4:
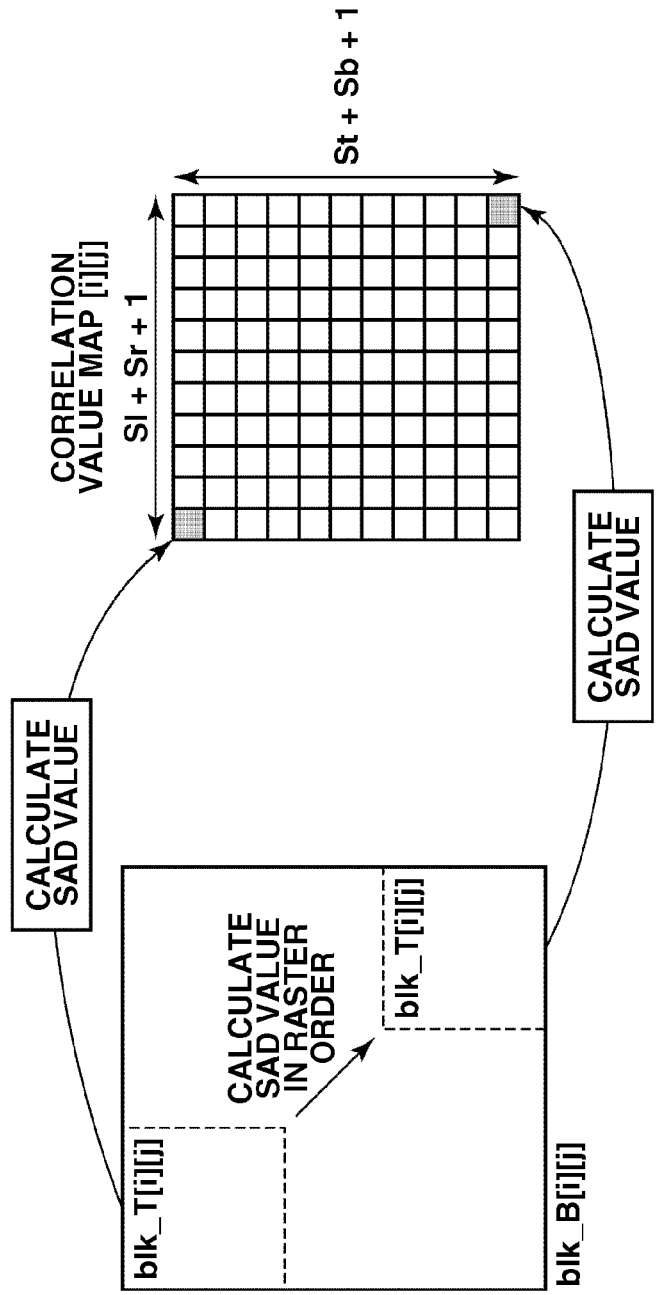
FIG. 4 illustrates a method for generating a correlation value map.

In step S202, the corresponding point detection unit 106 then sets i=0 and j=0. In step S203, the corresponding point detection unit 106 obtains a correlation value for each of the search areas from the detection block blk_T[i][j] and the detection block blk_B[i][j], to generate a correlation value map. In the present exemplary embodiment, the correlation value uses a summed absolute difference (hereinafter referred to as SAD) value. A method for generating the correlation value map will be described in detail referring to FIG. 4. As illustrated in FIG. 4, the detection block blk_T[i][j] is moved from the upper left to the lower right in a raster order within the detection block blk_B[i][j], and an SAD value is calculated at each of position of the search area, to generate a two-dimensional correlation value map. As a result, a correlation value map [i][j] of the number of horizontal elements (Sl+Sr+1) and the number of vertical elements (St+Sb+1) is generated.

Figure 5:
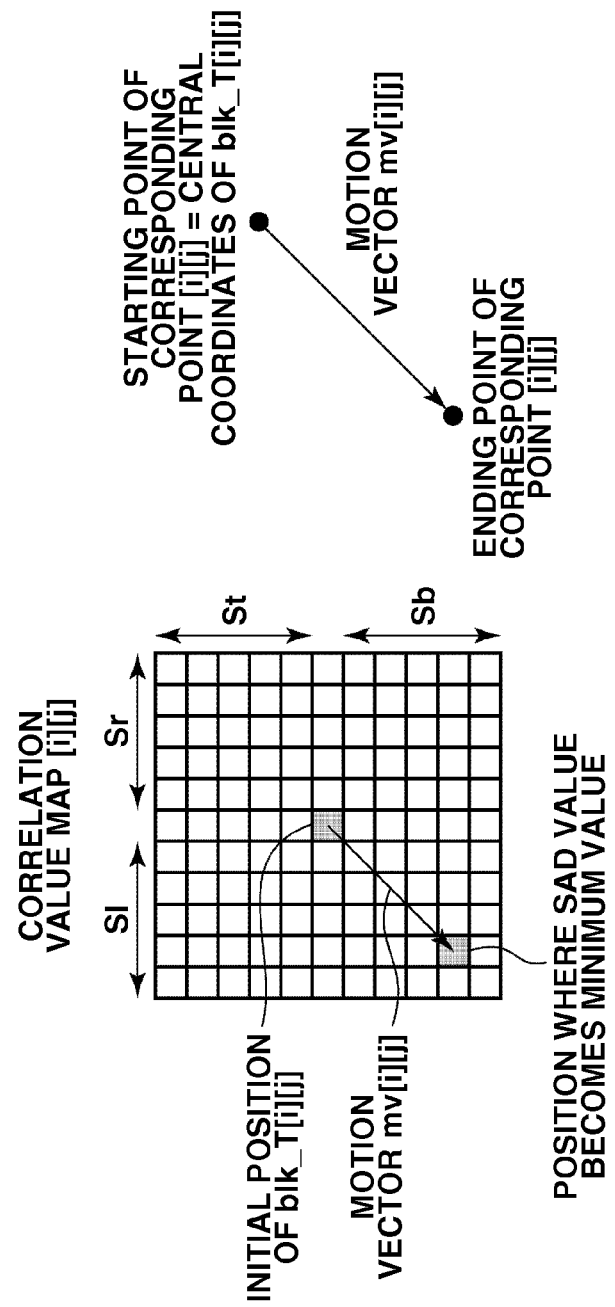
FIG. 5 illustrates a method for finding a corresponding point from the correlation value map.

In step S204, the corresponding point detection unit 106 then detects a plurality of corresponding points from the correlation value map [i][j]. The detection of the corresponding points will be described in detail referring to FIG. 5. As illustrated in FIG. 5, a position at which an SAD value becomes a minimum value is detected in the correlation value map [i][j]. The higher the degree of matching between patterns is, the smaller the SAD value is. Thus, a texture of the detection block blk_T[i][j] may be moved to the position at which the SAD value becomes a minimum value. Therefore, a vector with an initial position of the detection block blk_T[i][j] as a starting point and with the position at which the SAD value becomes a minimum value as an ending point is detected as a motion vector mv [i][j]. A corresponding point [i][j] corresponding to the detection block blk_T[i][j] with central coordinates of the detection block blk_T[i][j] as a starting point and with a point obtained by moving the starting point by the motion vector mv [i][j] as an ending point. The starting point and the ending point are defined in a set as information about a motion vector. A form of the information about a motion vector is not limited to this. For example, information by which the direction and the size of a motion vector can be known may be directly calculated and stored.

The foregoing is a method for detecting a corresponding point. In steps S205 and S206, the corresponding point detection unit 106 performs similar processing to that described above for all the blocks.

The foregoing is a processing content of the corresponding point detection unit 106. Corresponding points and correlation value maps, corresponding to a predetermined number of detection blocks, are generated as an output of the corresponding point detection unit 106.

The first memory unit 107 (a first memory) stores corresponding points and correlation value maps (a first storage step). A set of generated corresponding points, corresponding to a predetermined number of blocks, is referred to as a first corresponding point group (a first motion vector group).
Reliability Calculation Unit 108

The reliability calculation unit 108 calculates a reliability to position deviation detection for each of first corresponding point groups stored in the first memory unit 107. In the present exemplary embodiment, the degree of determination whether a template area (the detection block blk_T[i][j]) has a repetitive pattern is calculated as a reliability. If the template area has a repetitive pattern, a plurality of textures in the same shape exists in the periphery. Thus, the reliability as to whether a corresponding point accurately represents a position deviation can be low.

Figure 6:
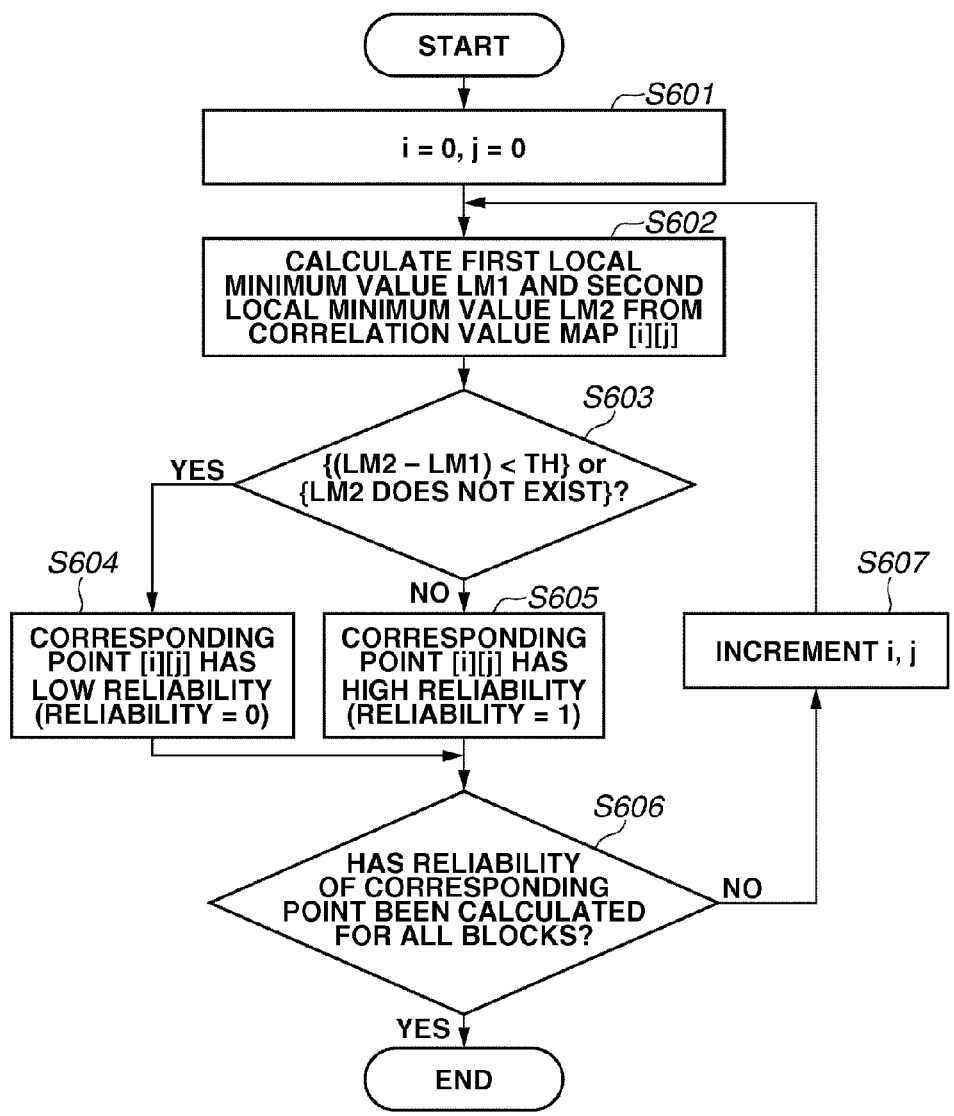
FIG. 6 is a flowchart illustrating processing performed by a reliability calculation unit 108 according to the first exemplary embodiment.

FIG. 6 is a flowchart illustrating processing performed by the reliability calculation unit 108. In step S601, the reliability calculation unit 108 first sets i=0 and j=0. In step S602, the reliability calculation unit 108 calculates a first local minimum value LM1 and a second local minimum value LM2 from a correlation value map [i][j]. FIGS. 7A and 7B illustrate a typical correlation value map obtained when a repetitive pattern exists, and a typical correlation value map obtained when a repetitive pattern does not exist, in one dimension for convenience. As illustrated in FIG. 7A, if a repetitive pattern exists, a plurality of positions where a texture area and a pattern substantially match each other can exist. Thus, in an SAD value distribution, a plurality of similar downwardly convex peaks exists. Therefore, a difference between the local minimum values LM1 and LM2 tends to be small. On the other hand, if a repetitive pattern does not exist, only one characteristic downwardly convex peak LM1 can exist. Thus, the local minimum value LM2 does not exist. Alternatively, if the local minimum value LM2 exists, a difference between the local minimum values LM1 and LM2 is large. FIG. 7B illustrates the latter case.

Based on the above-mentioned content, in step S603, the reliability calculation unit 108 determines whether either one of a condition (1) that a value of (LM2−LM1) is less than a predetermined threshold value Th1 and a condition (2) that LM2 does not exist is satisfied. If either one of the conditions (1) and (2) is satisfied (YES in step S603), then in step S604, the reliability calculation unit 108 considers that a repetitive pattern does not exist, and determines that a corresponding point [i][j] (motion vector) has a high reliability, to set the reliability to 1. If neither of the conditions (1) and (2) is satisfied (NO in step S603), then in step S605, the reliability calculation unit 108 considers that a repetitive pattern exists, and determines that the corresponding point [i][j] has a low reliability, to set the reliability to 0. In steps S606 and S607, the reliability calculation unit 108 performs similar processing for all the blocks.

The foregoing is a processing content of the reliability calculation unit 108. A reliability to each of the corresponding points [i][j] is calculated as an output of the reliability calculation unit 108.

A method for calculating the reliability by the reliability calculation unit 108 is not limited to this. For example, a predetermined frequency component (a high-frequency component) can also be extracted from each of the template areas (the detection block blk_T[i][j]), and the existence of a repetitive pattern can also be tested from its strength distribution. The reliability calculation unit 108 can also determine whether the template area is a low-contrast area where a motion vector is not easy to accurately obtain by seeing the distribution. If the repetitive pattern exists, the reliability is set to be low.

In a second storage step, a second memory (such as the second memory unit 109) stores a corresponding point having a reliability of 1, i.e., a corresponding point that has been determined to have a high reliability. Corresponding points, which have been determined to have respectively high reliabilities in the reliability calculation unit 108 in the first corresponding point group, are referred to as a second corresponding point group (a second motion vector group).
<Acceptable Corresponding Point Selection Unit 110>

The acceptable corresponding point selection unit 110 extracts only the corresponding point representing a camera shake from the detected corresponding point group. The first corresponding point group includes all the corresponding points regardless of their respective reliabilities. On the other hand, the second corresponding point group includes the corresponding points respectively having high reliabilities. In the present exemplary embodiment, the point is that a corresponding point representing a camera shake is particularly extracted from a corresponding point group having low reliabilities. Thus, a processing content of the acceptable corresponding point selection unit 110 is as follows in broad terms. First, the acceptable corresponding point selection unit 110 roughly estimates a position deviation due to a camera shake from the second corresponding point group, having high reliabilities, and then selects the corresponding point representing the camera shake, which matches the estimated position deviation, from the first corresponding point group. The processing content of the acceptable corresponding point selection unit 110 will be described in detail below with reference to the drawings.

FIG. 8 is a flowchart illustrating processing performed by the acceptable corresponding point selection unit 110 (an acceptable motion vector selection unit). In step S801, the acceptable corresponding point selection unit 110 first assigns priorities to the corresponding points included in the second corresponding point group based on a predetermined rule. In the present exemplary embodiment, the predetermined rule is a rule for assigning priorities to the corresponding points in the order of increasing distances from central coordinates of an image to their respective starting points. However, the rule is not particularly limiting.

In step S802, the acceptable corresponding point selection unit 110 then sets a loop count Loop to 0. In step S803, the acceptable corresponding point selection unit 110 selects a predetermined number of corresponding points according to the priorities from the second corresponding point group. The predetermined number is four in the present exemplary embodiment for reasons described below. More specifically, when Loop=0, four corresponding points are selected in the order of increasing distances from the central coordinates of the image to their respective starting points.

In step S804, the acceptable corresponding point selection unit 110 then estimates a temporary position deviation parameter from the selected corresponding points. The position deviation parameter in the present exemplary embodiment is a projective transformation coefficient. The projective transformation coefficient is expressed by the following equations:

$$x' = \frac{\alpha_0 x + \alpha_1 y + \alpha_2}{\alpha_6 x + \alpha_7 y + 1} \quad (1)$$

$$y' = \frac{\alpha_3 x + \alpha_4 y + \alpha_5}{\alpha_6 x + \alpha_7 y + 1} \quad (2)$$

In the above equations (1) and (2), (x, y) is a point in a target image, and (x', y') is a point to which the point (x, y) moves due to a position deviation within a base image. As can be seen from the equations (1) and (2), the number of unknowns is eight. Therefore, the number of required corresponding points is a minimum of four. In the present exemplary embodiment, a predetermined number is four for the above-mentioned reason. Further, a least-squares method is used as a method for estimating a position deviation parameter.

In step S805, the acceptable corresponding point selection unit 110 then determines acceptable corresponding points from the first corresponding point group, and counts the acceptable corresponding points. An acceptable corresponding point means a corresponding point at which a movement similar to a movement represented by a temporary position deviation parameter is detected (i.e., the acceptable corresponding point that corresponds to the temporary position deviation parameter). Such a corresponding point may also exist in the corresponding points having respectively low reliabilities. Therefore, the acceptable corresponding point is obtained from the first corresponding point group.

Figure 10:
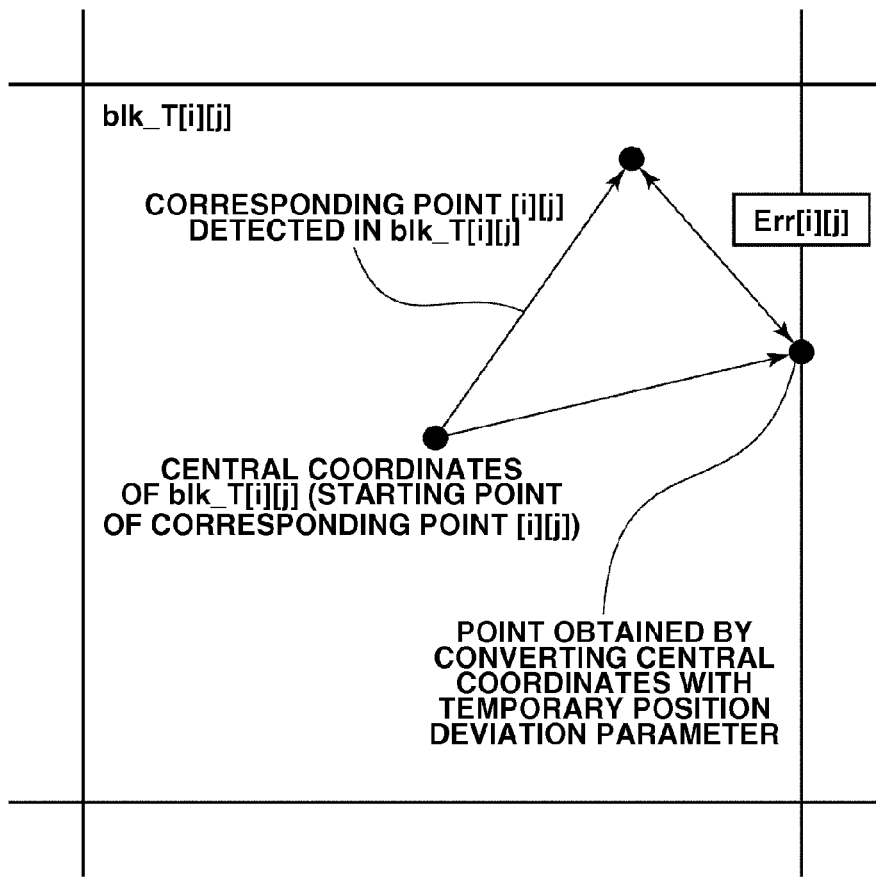
FIG. 10 illustrates a method for calculating an error Err [i][j].

FIGS. 9 and 10 illustrate details of acceptable corresponding point counting processing. FIG. 9 is a flowchart illustrating processing for counting acceptable corresponding points. In step S901, the acceptable corresponding point selection unit 110 first sets i=0, j=0, and Count_SP=0. In step S902, the acceptable corresponding point selection unit 110 then converts central coordinates of the detection block blk_T[i][j], i.e., a starting point of the corresponding point [i][j] with the temporary position deviation parameter. The coordinate conversion uses the above-mentioned equations (1) and (2).

In step S903, the acceptable corresponding point selection unit 110 then calculates an error Err[i][j] between end coordinates of the detected corresponding point [i][j] and coordinates after the coordinate conversion, as illustrated in FIG. 10. As can be seen from FIG. 10, the smaller the value of the error Err[i][j] is, the higher the degree of matching between a movement represented by the temporary position deviation parameter and a movement represented by the detected corresponding point [i][j] can be. Therefore, in step S904, the acceptable corresponding point selection unit 110 compares the error Err[i][j] with a predetermined threshold value TH2, and determines whether the error Err[i][j] is smaller than the threshold value TH2. If the error Err[i][j] is smaller than the threshold value TH2 (YES in step S904), then in step S906, the acceptable corresponding point selection unit 110 determines that the corresponding point [i][j] is an acceptable corresponding point, to increment a value of Count SP. On the other hand, if the error Err[i][j] is equal to or larger than TH2 (NO in step S904), then in step S905, the acceptable corresponding point selection unit 110 determines that the corresponding point [i][j] is not an acceptable corresponding point.

In steps S907 and S908, the acceptable corresponding point selection unit 110 performs the above-mentioned processing for all the corresponding points. In step S909, the acceptable corresponding point selection unit 110 determines that a final value of Count SP is the number of acceptable corresponding points.

In steps S806 and S807, the acceptable corresponding point selection unit 110 performs the above-mentioned acceptable corresponding point counting processing only by a predetermined loop count while changing a combination of corresponding points to be selected. In step S808, the acceptable corresponding point selection unit 110 then outputs a combination of acceptable corresponding points the counted number of which is the largest as an acceptable corresponding point group (acceptable motion vector group).

The foregoing is a processing content of the acceptable corresponding point selection unit 110. An acceptable corresponding point group representing a position deviation due to a camera shake is obtained as an output of the corresponding point selection unit 110. The acceptable corresponding point group is extracted from the first corresponding point group. Thus, a corresponding point representing a position deviation due to a camera shake can be extracted even if the corresponding point has a low reliability.

The position deviation parameter estimation unit 111 estimates a position deviation parameter from the acceptable corresponding point group. The position deviation parameter is a projective transformation coefficient, and a least-squares method is used as an estimation method.

The foregoing is a processing content of the position deviation detection unit 105. Position deviation detection processing is performed using each of the image 2, the image 3, and the image 4 as the target image so that position deviation parameters of the image 2, the image 3, and the image 4 with respect to the image 1 are output from the position deviation detection unit 105.

In an image position alignment unit 112, the image 2, the image 3, and the image 4 are geometrically deformed, respectively, using the position deviation parameters calculated for the image 2, the image 3, and the image 4, to perform processing for aligning the images with the image 1.

In the image combining unit 113, the image 1 is combined with the image 2, the image 3, and the image 4 that have been aligned with the image 1 in the image position alignment unit 112. In the present exemplary embodiment, noise is reduced by overlapping images. Therefore, in the image combining unit 113, the four images are additionally averaged. The image 1, the image 2, the image 3, and the image 4 are images that have been all captured with appropriate exposure.

Finally, a composite image generated by the image combining unit 113 is sent to an image display unit 114 and an image recording unit 115.

As described above, according to the processing in the first exemplary embodiment, a temporary conversion parameter is calculated from the second corresponding point group having high reliabilities. However, an acceptable corresponding point is selected from the first corresponding point group including corresponding points respectively having low reliabilities. Therefore, only the corresponding point at which a position deviation due to a camera shake is correctly detected out of the corresponding points having low reliabilities can be put in the acceptable corresponding points. A position deviation estimation accuracy can be expected to be better than that in a conventional technique for estimating a position deviation using only a corresponding point having a high reliability.

A second exemplary embodiment of the present invention will be described below with reference to the drawings.

In the first exemplary embodiment, repetitive pattern determination has been performed as a reliability as to whether a corresponding point correctly detects a position deviation. In the present exemplary embodiment, an amount of texture included in a template area (template image) is determined as a reliability. If the amount of texture in the template area is small, a difference in an SAD value between the template area and a peripheral area hardly becomes large so that the amount of texture cannot have a local peak at a position representing a position deviation. Therefore, an accuracy of detecting the position deviation may be reduced. As a result, the smaller the amount of texture is, the lower the reliability can be.

Figure 11:
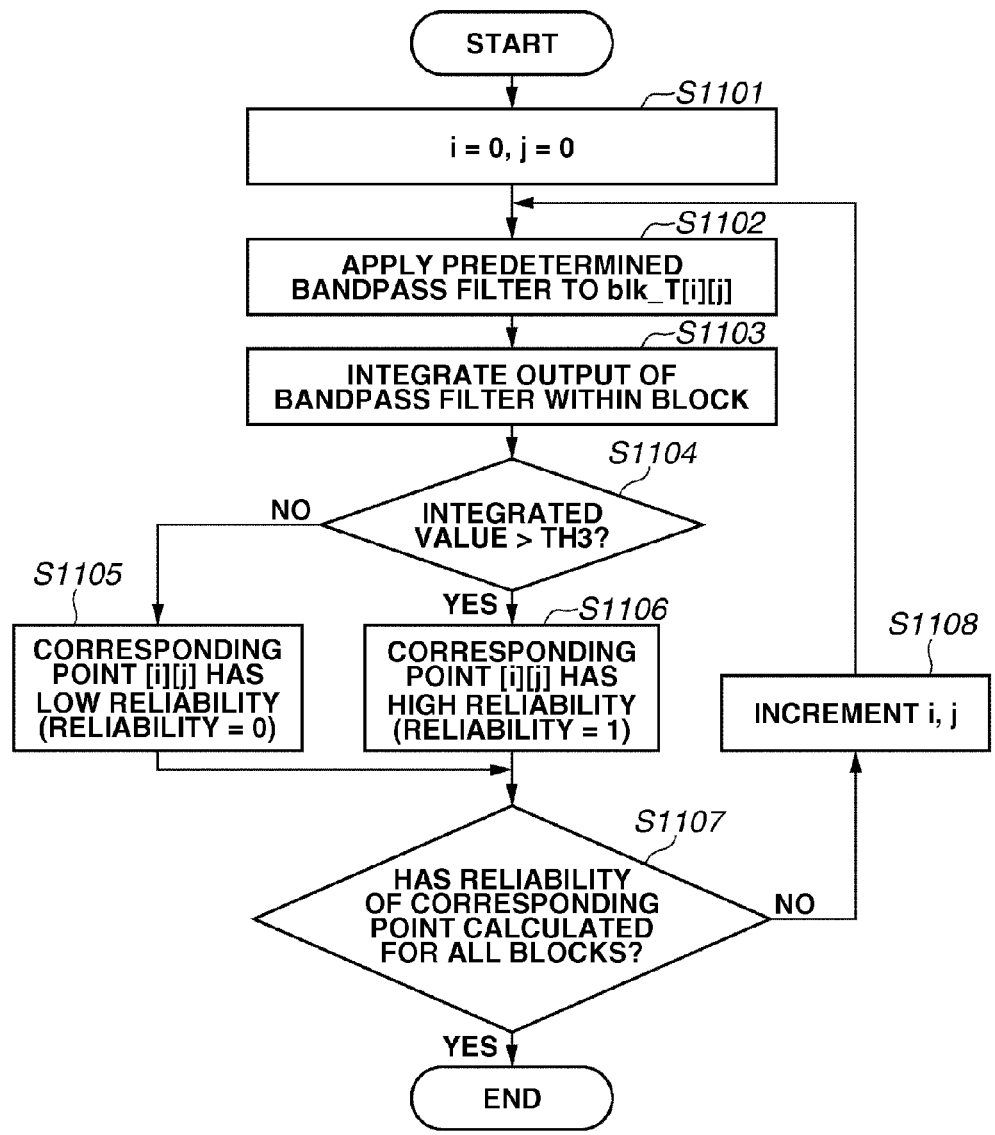
FIG. 11 is a flowchart illustrating processing performed by a reliability calculation unit 108 according to a second exemplary embodiment.

FIG. 11 is a flowchart illustrating processing performed by a reliability calculation unit 108 in the second exemplary embodiment. In step S1101, the reliability calculation unit 108 first sets i=0 and j=0. In step S1102, the reliability calculation unit 108 applies a bandpass filter for passing only a predetermined band to a detection block blk_T[i][j], i.e., a template area. In the present exemplary embodiment, the bandpass filter is set to pass a component having a relatively high frequency to extract an edge component.

In step S1103, the reliability calculation unit 108 then integrates an absolute value of an output of the bandpass filter within the template area. In the present exemplary embodiment, the output of the bandpass filter is an edge signal. Therefore, the larger an amount of texture within the template area is, the larger an integrated value of the absolute value of the output can be.

In step S1104, the reliability calculation unit 108 then determines whether the integrated value is larger than a threshold value TH3. If the integrated value is larger than the predetermined threshold value TH3 (YES in step S1104), then in step S1106, the reliability calculation unit 108 determines that a corresponding point [i][j] has a high reliability. On the other hand, if the integrated value is equal to or smaller than the predetermined threshold value TH3 (NO in step S1104), then in step S1105, the reliability calculation unit 108 determines that the corresponding point [i][j] has a low reliability. In steps S1107 and S1108, the reliability calculation unit 108 performs similar processing for all blocks.

The foregoing is a processing content of the reliability calculation unit 108 according to the second exemplary embodiment. The other processing is similar to that in the first exemplary embodiment. While the reliability has been determined from the amount of texture in the second exemplary embodiment, the reliability may be determined from both the repetitive pattern and the amount of texture. Further, the reliability may be determined using other elements, for example, by comparing minimum values of the SAD value.

A third exemplary embodiment of the present invention will be described in detail below with reference to the drawings.

In the first and second exemplary embodiments, a reliability of position deviation detection for each of corresponding points is calculated, and the corresponding point having a low reliability is put in only a first corresponding point group, to perform acceptable corresponding point determination. However, particularly if a repetitive pattern exists, a minimum value of an SAD value may not correctly represent a position deviation. In such a case, the SAD value can also take a local minimum value closer to the minimum value than a predetermined difference value at a place correctly representing a position deviation. Therefore, as for the corresponding point having a low reliability, not only a point at which the SAD value becomes a minimum value but also a corresponding point represented by a local minimum value other than the minimum value can also be effectively put in the first corresponding point group so that, in the acceptable corresponding point determination, only corresponding points representing correct position deviation can be extracted. More specifically, while only one corresponding point is detected for one detection block in the first and second exemplary embodiments, a plurality of corresponding points may be detected from one detection block in the third exemplary embodiment.

Figure 12:
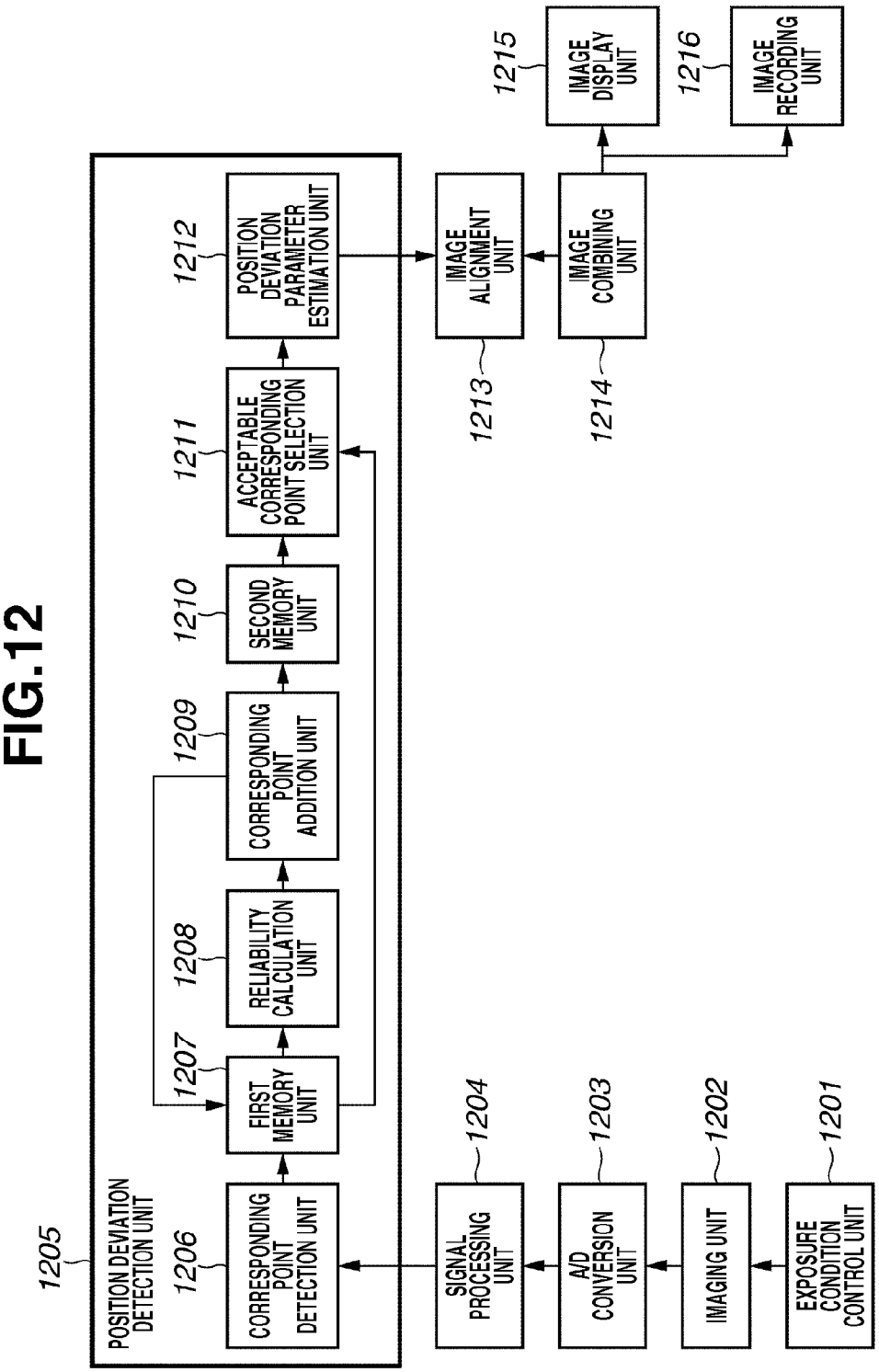
FIG. 12 is a block diagram illustrating a configuration of an image processing apparatus according to a third exemplary embodiment.

FIG. 12 is a block diagram illustrating a configuration applicable to an image processing apparatus according to the present exemplary embodiment.

A configuration illustrated in FIG. 12 differs from the configuration illustrated in FIG. 1 in that a corresponding point addition unit 1209 is newly added. Therefore, a processing content of the corresponding point addition unit 1209 will be described in detail below.

<Corresponding Point Addition Unit 1209>

Figure 13:
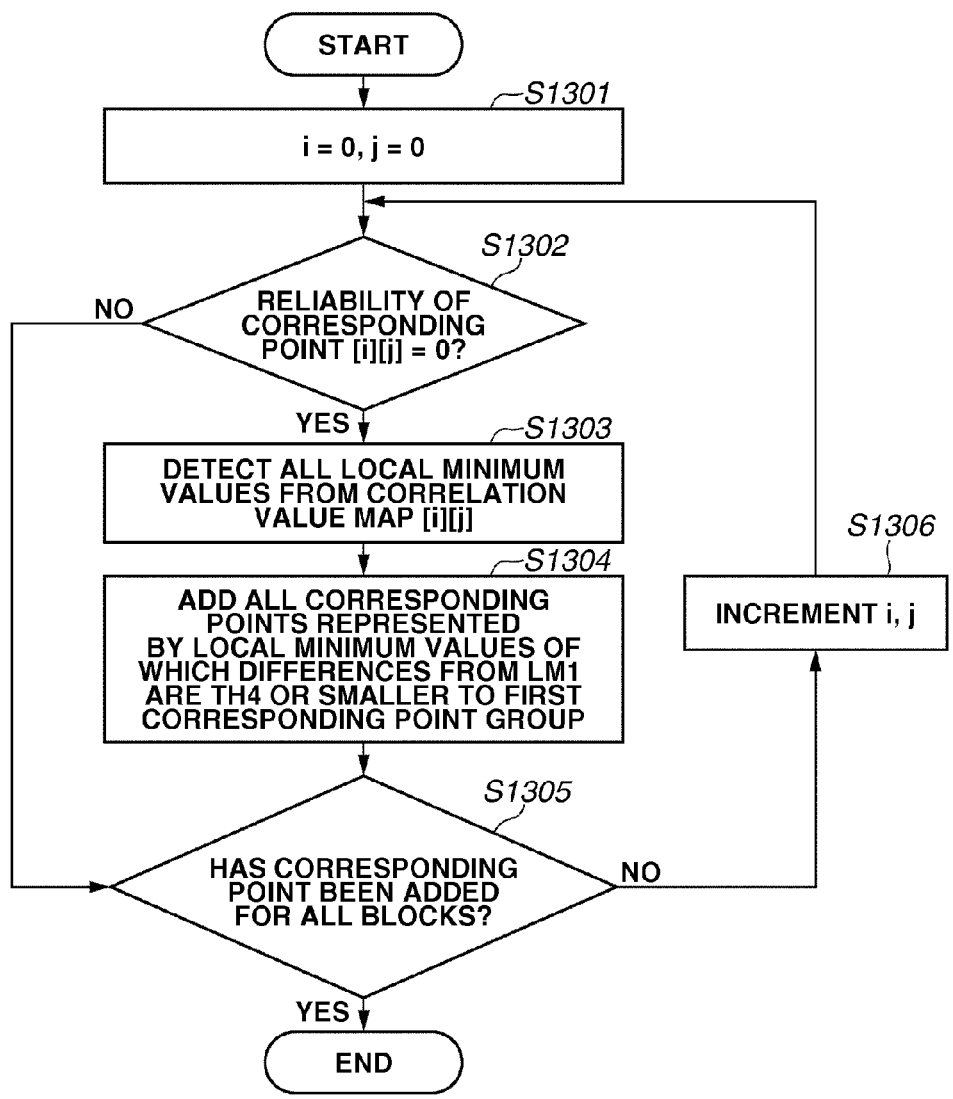
FIG. 13 is a flowchart illustrating processing performed by a corresponding point addition unit 1209.

FIG. 13 is a flowchart illustrating processing performed by the corresponding point addition unit 1209. In step S1301, the corresponding point addition unit 1209 first sets i=0 and j=0. In step S1302, the corresponding point addition unit 1209 then confirms a reliability of a corresponding point [i][j]. If the corresponding point [i][j] has a reliability of 1, i.e., has a high reliability, the possibility that a corresponding point detected at a minimum value of an SAD value represents a position deviation is high, so that a corresponding point is not added. On the other hand, if the corresponding point [i][j] has a reliability of 0, i.e., has a low reliability, the possibility that the corresponding point detected at the minimum value of the SAD value represents a position deviation is relatively low, so that corresponding point addition processing is performed.

In steps S1303 and S1304, the corresponding point addition unit 1209 then detects all local minimum values from a correlation value map [i][j]. A corresponding point represented by a local minimum value closer to a first local minimum value LM1 than a predetermined difference value may possibly represent a position deviation due to a camera shake. Therefore, a difference of each of the local minimum values from the first local minimum value LM1 is taken, and all the corresponding points represented by local minimum values of which the difference from the first local minimum value LM1 is TH4 or smaller are added to a first corresponding point group stored in a first memory. A corresponding point added by the corresponding point addition unit 1209 is hereinafter referred to as an added corresponding point.

In steps S1305 and S1306, the corresponding point addition unit 1209 performs the above-mentioned processing on all blocks. As a result of the processing performed by the corresponding point addition unit 1209, a plurality of added corresponding points may be added to the first corresponding point group stored in the first memory.

As described above, according to the third exemplary embodiment, in a detection block having a low reliability, an added corresponding point represented by the local minimum value closer to the first local minimum value than a predetermined difference value is added to the first corresponding point group. Thus, when an acceptable corresponding point is selected, a corresponding point representing a camera shake is selected from the first corresponding point group including the added corresponding point. Therefore, an estimation accuracy can be expected to be better than that in the first and second exemplary embodiments in which only a corresponding point that is highest in correlation with each of detection blocks is included in the first corresponding point group.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-200299 filed Sep. 12, 2012, which is hereby incorporated by reference herein in its entirety.

What is claimed is:

1. An image processing apparatus configured to detect a position deviation between a first image and a second image, the image processing apparatus comprising:
    a detection unit configured to detect a plurality of motion vectors between the first image and the second image for each area;
    a first memory configured to store respective pieces of information about the plurality of motion vectors as a first motion vector group;
    a reliability calculation unit configured to calculate a reliability with respect to the detection of the position deviation for each of the pieces of information about the motion vectors to be read out of the first memory;
    an extraction unit configured to extract the information about the motion vector of which reliability has been determined to be higher than a predetermined threshold value;
    a second memory configured to store the extracted information about the motion vector as a second motion vector group;
    a selection unit configured to calculate a temporary position deviation parameter from the second motion vector group to be read out of the second memory, and to select the motion vector representing a position deviation corresponding to a position deviation represented by the temporary position deviation parameter as an acceptable motion vector group from the first motion vector group; and
    a parameter estimation unit configured to estimate the position deviation parameter representing the position deviation from the acceptable motion vector group.

2. The image processing apparatus according to claim 1, wherein the detection unit calculates a correlation value for each of the areas between the first image and the second image, determines a position where the correlation value is the smallest as an ending point of the motion vector in the area, and determines a position in the first image of the area as a starting point of the motion vector.

3. The image processing apparatus according to claim 2, wherein the reliability calculation unit calculates local minimum values of the correlation value in the correlation values of the motion vectors, determines the local minimum value having the smallest value as a first local minimum value, determines the local minimum value having the second smallest value as a second local minimum value, and determines a reliability based on a difference value between the second local minimum value and the first local minimum value.

4. The image processing apparatus according to claim 3, wherein a motion vector group represented by the plurality of local minimum values is added to the first motion vector group for the area that has been determined to have a low reliability.

5. The image processing apparatus according to claim 2, wherein the reliability calculation unit extracts components having a predetermined frequency for each of the areas, and determines a reliability based on a distribution of the components having the predetermined frequency.

6. The image processing apparatus according to claim 1, wherein the selection unit stores a number of motion vectors for which an error of a movement of the motion vector included in the first motion vector group to be read out from the first memory from a movement represented by the calculated temporary position deviation parameter is smaller than a predetermined threshold value, and selects the motion vectors in which the stored number is the largest as the acceptable motion vector group.

7. The image processing apparatus according to claim 1, wherein the position deviation parameter is a projective transformation coefficient.

8. The image processing apparatus according to claim 1, further comprising an alignment unit configured to perform alignment processing between the first image and the second image using the position deviation parameter.

9. An image processing method for detecting a position deviation between a first image and a second image, the method comprising:
    detecting a plurality of motion vectors between the first image and the second image;
    storing the plurality of motion vectors as a first motion vector group in a first memory;
    calculating a reliability with respect to the detection of the position deviation for each of the motion vectors to be read out of the first memory;
    extracting the motion vector(s) for which the reliability has been determined to be higher than a predetermined threshold value;
    storing the extracted motion vector(s) in an extracted motion vector group as a second motion vector group in a second memory;
    calculating a temporary position deviation parameter from the second motion vector group to be read out from the second memory, and selecting the motion vector representing a position deviation corresponding to a position deviation represented by the temporary position deviation parameter as an acceptable motion vector group from the first motion vector group; and
    estimating the position deviation parameter representing the position deviation from the acceptable motion vector group.

10. A non-statutory computer readable storage medium storing a computer executable program wherein the instructions, when executed by one or more computing devices, cause the one or more computing devices to perform the image processing method according to claim 9.

11. An image processing apparatus configured to detect a position deviation between a first image and a second image, the image processing apparatus comprising:
- a detection unit configured to detect a plurality of motion vectors between the first image and the second image for each area;
- a memory configured to store the plurality of motion vectors as a first motion vector group;
- a reliability calculation unit configured to calculate a reliability with respect to the detection of the position deviation for each of the motion vectors included in the first motion vector group;
- an extraction unit configured to extract the motion vector of which reliability has been determined to be higher than a predetermined threshold value;
- a selection unit configured to calculate a temporary position deviation parameter from the extracted motion vector, and to select the motion vector representing a position deviation corresponding to a position deviation represented by the temporary position deviation parameter as an acceptable motion vector group from the first motion vector group; and
- a parameter estimation unit configured to estimate the position deviation parameter representing the position deviation from the acceptable motion vector group.

12. The image processing apparatus according to claim 11, wherein the detection unit calculates a correlation value for each of the areas between the first image and the second image, determines a position where the correlation value is the smallest as an ending point of the motion vector in the area, and determines a position in the first image of the area as a starting point of the motion vector.

13. The image processing apparatus according to claim 12, wherein the reliability calculation unit calculates local minimum values of the correlation value in the correlation values of the motion vectors, determines the local minimum value having the smallest value as a first local minimum value, determines the local minimum value having the second smallest value as a second local minimum value, and determines a reliability based on a difference value between the second local minimum value and the first local minimum value.

14. The image processing apparatus according to claim 11, wherein the selection unit stores a number of motion vectors for which an error of a movement of the motion vector included in the first motion vector group from a movement represented by the calculated temporary position deviation parameter is smaller than a predetermined threshold value, and selects the motion vectors in which the stored number is the largest as the acceptable motion vector group.

15. The image processing apparatus according to claim 11, wherein the position deviation parameter is a projective transformation coefficient.

16. The image processing apparatus according to claim 11, further comprising an alignment unit configured to perform alignment processing between the first image and the second image using the position deviation parameter.

* * * * *